United States Patent [19]

Feigler

[11] Patent Number: 5,113,989
[45] Date of Patent: May 19, 1992

[54] ACTUATING ASSEMBLY FOR A CLUTCH RELEASE BEARING, IN PARTICULAR FOR AN AUTOMOTIVE VEHICLE

[75] Inventor: Jacques Feigler, St. Brice-sous-Forêt, France

[73] Assignee: Valeo, Paris, France

[21] Appl. No.: 597,884

[22] Filed: Oct. 12, 1990

[30] Foreign Application Priority Data

Oct. 13, 1989 [FR] France .................. 89 13435

[51] Int. Cl.⁵ .............................................. F16D 23/14
[52] U.S. Cl. ................................ 192/98; 192/70.13; 192/89 B
[58] Field of Search ................. 192/98, 89 B, 110 B, 192/70.13, DIG. 1

[56] References Cited

U.S. PATENT DOCUMENTS

| | | | |
|---|---|---|---|
| 4,228,882 | 10/1980 | Haber et al. | 192/98 |
| 4,613,027 | 4/1986 | Lassiaz et al. | 192/89 B |
| 4,648,499 | 3/1987 | Despres et al. | 192/98 |
| 4,664,241 | 5/1987 | Renaud et al. | 192/98 |
| 4,782,935 | 11/1988 | Gay et al. | 192/98 |
| 4,809,835 | 3/1989 | Ziegler et al. | 192/89 B |
| 4,909,370 | 3/1990 | Limbacher et al. | 192/98 |
| 4,667,8090 | 5/1987 | Lassiaz et al. | 192/98 |

FOREIGN PATENT DOCUMENTS

| | | |
|---|---|---|
| 2623863 | 6/1989 | France . |
| 2624935 | 6/1989 | France . |
| 2630174 | 10/1989 | France . |
| 2182111 | 5/1987 | United Kingdom . |

*Primary Examiner*—Richard Lorence
*Attorney, Agent, or Firm*—Longacre & White

[57] ABSTRACT

An actuating assembly, for coupling a clutch release bearing in traction to the diaphragm of a clutch of an automotive vehicle, includes an actuating member carrying a coupling piece and including a flange having two distinct openings separated by a bridge portion. The coupling piece has two arms which are arranged to hook one over the other, and which extend through the openings in the flange.

Each arm of the couplings has at least one local deformation which increases its length in a resilient manner.

6 Claims, 3 Drawing Sheets

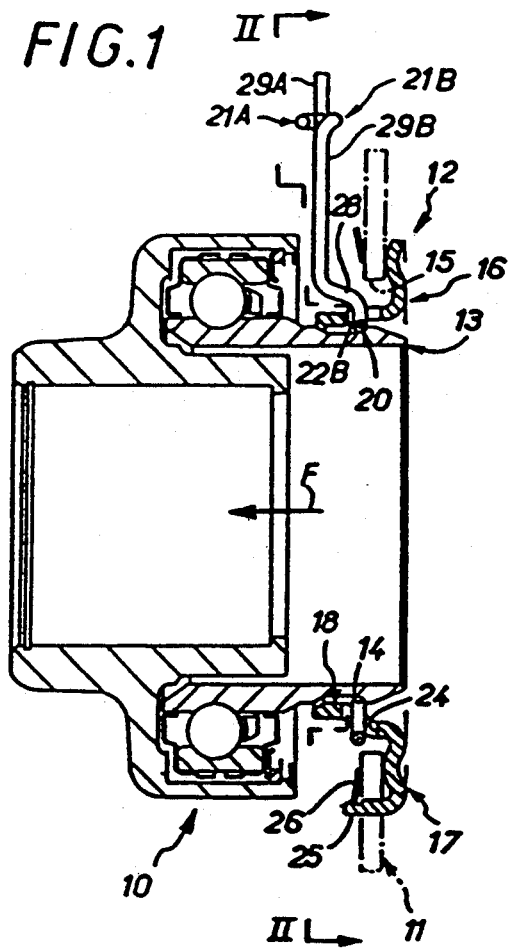
FIG.1
(PRIOR ART)
FIG.2
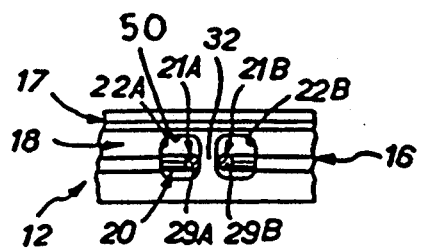
(PRIOR ART)
FIG.4
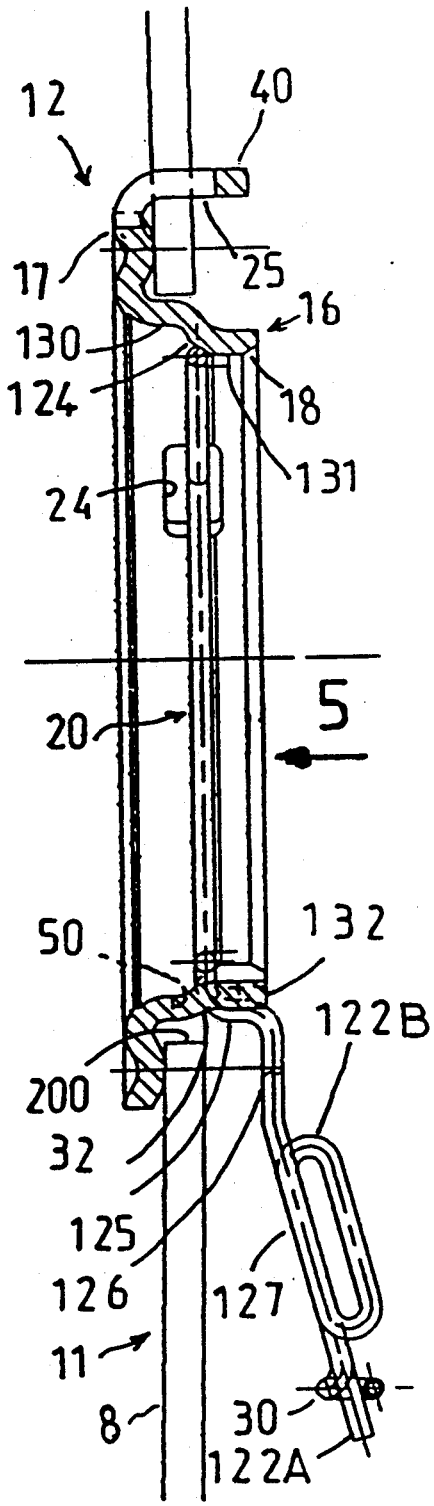

ACTUATING ASSEMBLY FOR A CLUTCH RELEASE BEARING, IN PARTICULAR FOR AN AUTOMOTIVE VEHICLE

FIELD OF THE INVENTION

The present invention relates generally to the coupling of a clutch release bearing to the diaphragm of a clutch, where the clutch release bearing is arranged to act in traction on the diaphragm. It is applicable in the case in which, to this end, an actuating assembly is used which is of the kind described in the specifications of French published patent applications Nos. FR 2 624 935A and FR 2 630 174A.

BACKGROUND OF THE INVENTION

The arrangement described in the above mentioned specification FR 2 630 174A will first be described with reference to FIGS. 1 and 2 of the accompanying drawings, which are identical to FIGS. 1 and 3 of specification No. FR 2 630 174A. In these figures, the actuating assembly includes an actuating member 16, which is here made of pressed steel plate and which has a collar portion 17 adapted for bearing against the diaphragm 11 of the clutch, on the side of the latter opposite to the clutch release bearing, which is indicated at 10. The actuating member 16 here has a curved transverse profile, and, integrally with the collar portion 17, a projecting flange 18 which extends through a central opening 15 in the diaphragm 11, between the latter and the striker or nose portion 13 of the clutch release bearing. The actuating assembly also includes a coupling piece 20 which is resiliently deformable in the radial direction. The coupling piece 20 has a ring portion which extends within the flange 18 of the actuating member 16, between the latter and the nose portion 13, and is adapted to couple the clutch release bearing 10 to the actuating member by a simple snap action, at least in the axial direction which corresponds to the exertion of a tractive force on the diaphragm 11 by the clutch release bearing 10. This direction is that indicated by the arrow F in FIG. 1, i.e. going from the collar portion 17 towards the coupling piece 20.

The ring portion of the coupling piece 20 is interrupted by a gap defined between two integral arms 21A and 21B, each of which extends through a respective opening 22A, 22B formed in the flange 18, the coupling piece itself being carried by this flange. The openings 22A and 22B are circumferentially separated from each other by a bridge portion 32, and each opening 22A or 22B extends over a distance greater than the diameter of the round wire from which the coupling piece 20 is formed, by an amount which is as great in the circumferential as in the axial direction.

The arms 21A and 21B are arranged to hook resiliently one over the other, in such a way that the coupling piece 20 is closed on itself with its two arms then bearing against the bridge portion 32 as can be seen from FIG. 2. The coupling piece 20 also has at least one supplementary lug which is in engagement with an aperture 24 formed in the flange 18.

In specification No. FR 2 624 935A, this supplementary lug is arranged to be flexible in order to facilitate the fitting of the actuating assembly by a snap action. Such an arrangement leaves the arms 21A and 21B, and more particularly their radial width, unchanged, which enables any interference with the clutch release bearing and/or with the diaphragm to be avoided.

The Applicant has however been presented with the problem of making the coupling piece flexible, not in respect of its supplementary lug but in respect of its arms, without increasing the radial length of the arms in a detrimental manner.

DISCUSSION OF THE INVENTION

In accordance with the invention, there is provided an actuating assembly for the actuation, in traction by a clutch release bearing, of the diaphragm of a clutch, the actuating assembly being of the kind comprising, firstly, an actuating member including a collar portion for engagement on the diaphragm and, integral with the said collar portion, a flange adapted to extend through the said diaphragm via the central opening of the latter; and secondly, extending in the form of a ring within the said flange, a coupling piece which is deformable resiliently in the radial direction and adapted for attachment to the clutch release bearing by simple snap-fitting of the latter at least in the axial direction going from the collar portion towards the said coupling piece, the said flange having two distinct openings, for the passage of a respective arm of the coupling piece through each said opening, the said openings being separated from each other by a bridge portion, the said arms being directed outwardly with respect to the flange and being hooked one on to the other, wherein each of the said arms has a local deformation increasing its length in a resilient manner.

This arrangement increases the flexibility of the coupling piece and in addition its gripping effect is improved, in such a way that, in particular, dismantling of the assembly is made easier.

It will be appreciated that the radial length of the arms is not increased in a detrimental manner, so that all interference with the clutch release bearing and/or with the diaphragm may be avoided.

Each arm is preferably provided with at least one loop acting as a traction spring.

The loops which are provided in an arrangement in accordance with the invention are turned back so as to increase the length of the arms, and are preferably arranged in the form of a spring of the clothes-peg type. It will be appreciated that the gripping effect of the coupling piece is improved in a simple manner. It is of course possible, in order to increase the flexibility of the coupling piece, to provide the arms with several loops which generally constitute the turns of a helical spring.

According to a feature of the invention, it is possible to marry this arrangement with that disclosed in the above mentioned specification No. FR 2 624 935A. In a modification, the supplementary lugs may be of reduced cross section.

In accordance with a further feature of the invention, that portion of the flange which includes the openings through which the arms of the coupling piece extend, is deformed at least radially away from the axis of the assembly in the shape of a curved portion which is concave towards the said axis. In this way, the geometric quality and the dimensioning of the internal bore of the flange of the actuating member are improved in a simple and economical manner.

As a result of the arrangement in accordance with the invention, the pre-positioning of the coupling piece is improved without introducing any difficulties in the course of fitting, due to the additional elasticity in the coupling member which is given by virtue of the loops formed in its arms.

The description of a preferred embodiment of the invention, which follows, is given by way of example only and with reference to the accompanying drawings, in which:

BRIEF DESCRIPTION OF THE DRAWINGS

FIG. 1 is a view in axial cross section of an actuating assembly, identical to that shown in FIG. 1 of French published patent application No. FR 2 630 174A and shown in position between the diaphragm of a clutch and the clutch release bearing which is adapted to act on the diaphragm.

FIG. 2 is a partial view shown in circumferential cross section, identical to FIG. 3 of the same document FR 2 630 174A.

FIG. 4 is a view in axial cross section of an actuating member in accordance with the invention, mounted on the diaphragm and equipped with its coupling piece.

DESCRIPTION OF A PREFERRED EMBODIMENT OF THE INVENTION

Figure 3:
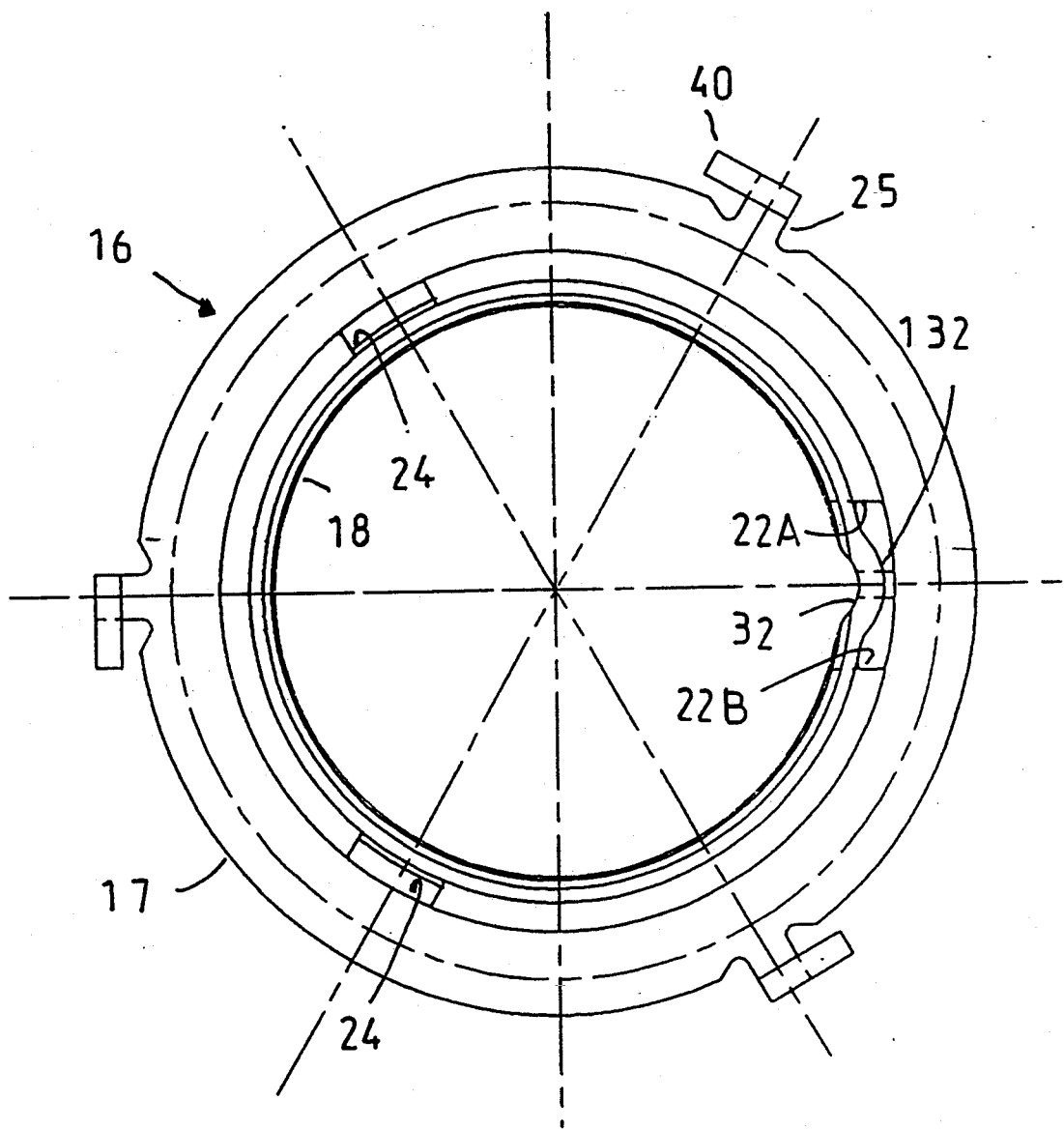
FIG. 3 is an end view of the actuating member in accordance with the invention.

For simplicity, the same reference numerals will be used for those elements that are common to the present invention and to the prior art as described above with reference to FIGS. 1 and 2.

In the present example, the clutch release bearing 10 includes a striker or nose portion 13 for acting on the clutch diaphragm 11. The nose portion 13 comprises an extension of the inner ring of a ball bearing. On the outer periphery of the nose portion 13 there is a transverse shoulder 14 which constitutes a thrust surface. The shoulder 14 delimits a groove, within which the coupling piece 20, carried by the actuating member 16, lies after being snap-fitted to the clutch release bearing 10. The coupling piece 20 is resiliently deformable in the radial direction, and cooperates with the internal bore of the flange 18. With regard to the diaphragm 11, it will be noted that its central portion is formed with radial fingers which are separated by slots (see FIG. 5), and that the diaphragm has a central opening 15 radially inward of its fingers.

Figure 5:
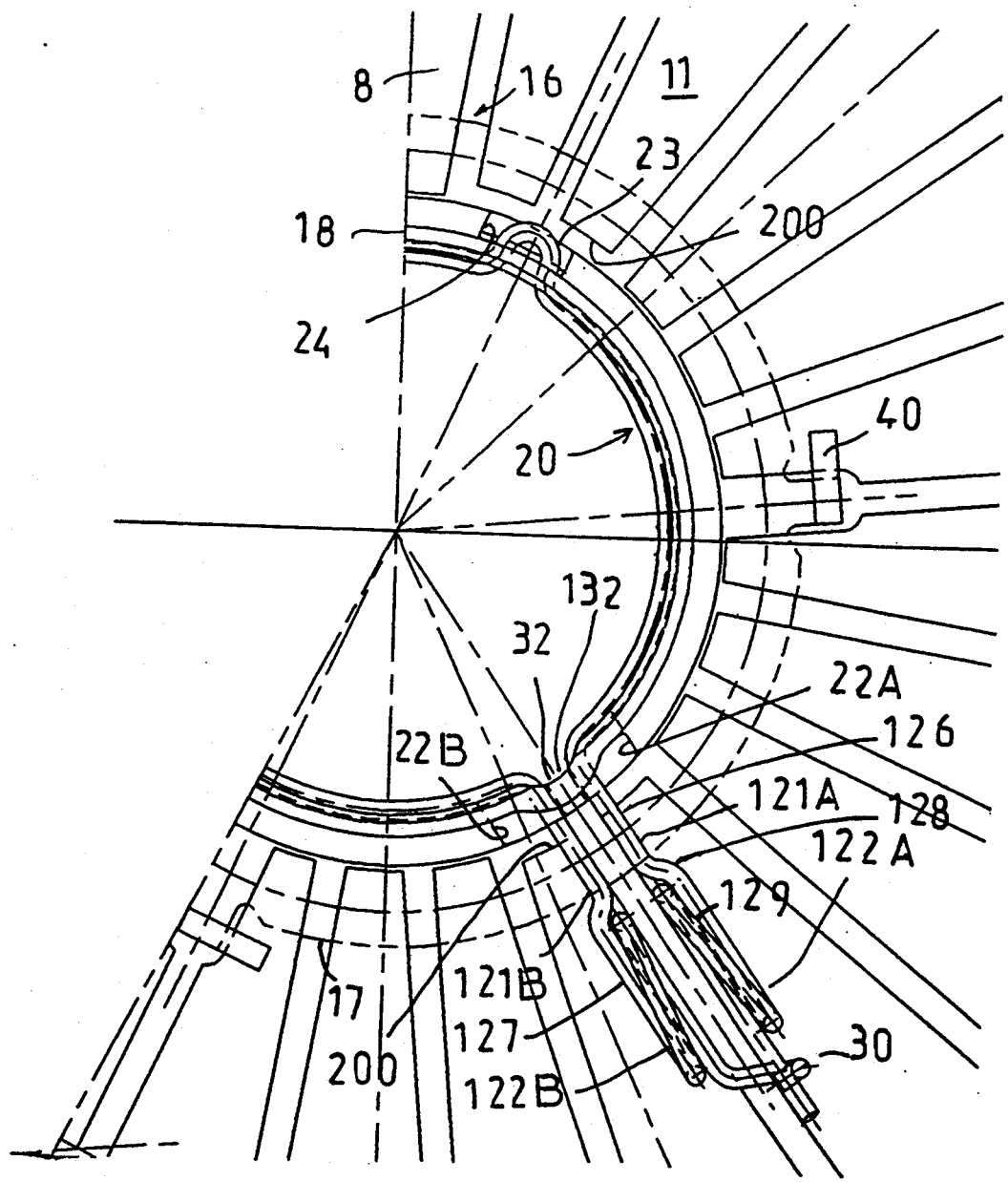
FIG. 5 is a partial view as seen in the direction of the arrow 5 in FIG. 4.

In FIGS. 3 to 5, in order to hold the actuating assembly 12, which is, like that of FIGS. 1 and 2, provided for the actuation, by a clutch release bearing 10, of the diaphragm 11 in a tractive mode, the collar portion 17 of the actuating member 16 has radial fingers 25 distributed over its outer periphery. The fingers 25 are directed axially in the same direction as the flange 18 of the actuating member. Each finger 25 extends through a respective one of the radial slots which separate the radial fingers of the diaphragm. Each finger 25 of the actuating member 16 carries a retaining finger 40, extending circumferentially and cantilevered from the corresponding radial finger 25 in line with the engagement collar portion 17 and generally parallel to the latter.

The retaining fingers 40, cooperating with the collar portion 17, ensure that the assembly is held axially on the diaphragm in the manner described in the above mentioned specification No. FR 2 624 935A.

The coupling piece 20, being resilient in the radial direction, extends in a plane which is substantially perpendicular to the axis of the assembly, and is made of round wire. It is open between two generally-radial arms 121A and 121B, which are integral extensions of the ring, and each of which passes through a respective one of two separate openings 22A and 22B formed through the flange 18, so as to extend radially outwards beyond the flange 18. That part of the flange 18 that includes the openings 22A and 22B for accommodating the arms 121A and 121B is deformed at least partly in the radial direction away from the axis of the assembly, to form a curved portion 132 which is concave towards the axis of the assembly. Although it would be possible to deform the two openings 22A and 22B, in FIGS. 3 to 5 it is the bridge portion 32 that is locally deformed in the radial direction away from the axis of the assembly, this bridge portion being partly curved inwards as is best seen in FIGS. 3 and 5.

The flange 18 includes a frusto conical section 124 having a frusto conical internal surface, and two cylindrical portions 130 and 131 which extend on either side of the section 124. The portion 130 has the larger diameter, and is joined to the collar portion 17 through a curved section, while the cylindrical portion 131 defines the free end of the flange 18, being chamfered and having the smaller diameter. The local curved portion 132 (see FIG. 4) includes part of the bridge portion 32, as well as the whole of the cylindrical portion 131 in the axial alignment of the bridge portion 32. Part of the section 124 is also affected by the curved portion 132.

The coupling piece 20 also includes at least one radially extending supplementary lug 23, which is itself in engagement with an aperture 24 of the flange 18, this aperture being wider in the circumferential direction than the openings 22A and 22B. In the present example, there are two supplementary radial lugs 23, in the form of approximately semicircular local deformations of the circular part of the coupling piece. Two corresponding apertures 24 are provided, each one at approximately 120° from the openings 22A and 22B.

The lugs 23 are in contact with only one of the lateral or circumferential edges of the apertures 24, so as to enable the coupling piece 20 to expand during snap fitting with the clutch release bearing 10. In order to increase the elasticity of the coupling piece 20 when in an open state, each of the two arms 121A and 121B is provided with a local deformation, indicated at 122A and 122B respectively, which increases its length in an elastic manner. In FIGS. 3 to 5, these local deformations 122A and 122B are in the form of loops. Each of these loops constitutes a turn of a spring of the tension type, and, after being fitted, extends radially outwardly of the clutch release bearing. These loops reduce the rigidity of the coupling piece, which facilitates both snap fitting and gripping.

More precisely, on the outside of the flange 18 the arms 121A and 121B have two curved portions beyond the loops 122A and 122B, so that the ends of the arms, which are offset axially with respect to the coupling piece 20, extend together in a plane which is parallel to the generally circular ring portion of the coupling piece between the clutch release bearing 10 and the diaphragm 11. The end of the arm 121B forms an oblique hook 30 so that the arm can be hooked resiliently on the straight part of the arm 121A.

Referring now to FIGS. 4 and 5, each of the arms 121A and 121B, has an axial orientation portion 125 which, after passing through the openings 22A and 22B when the clutch release bearing has been mounted, is in contact with the outer surface of the flange 18, and more particularly with the outer surface of the cylindrical portion 131 of the latter. The axial orientation portion 125 of the arm is extended in a first radial portion 126 and then in an inclined, second radial portion 127 in the plane of FIG. 4 and including the loop. The portions 126 are closer to each other than are the portions 127, and allow the diaphragm 11 to tilt.

An S-shaped bend 128 connects the two portions 126 and 127 of each arm together, these portions being parallel with each other in each of the two arms 121A and 121B. The portion 127 comprises two radial portions which are offset axially and which are parallel with each other, these radial portions being connected through the inclined portion 129 of a loop 122A, 122B. The inclined portion 129 thus generally defines a turn of a helical spring, while the loops constitute a spring of the clothes-peg type. The loops thus form a coil. It will be understood from the foregoing that the bends 128 enable the loops to be accommodated.

It is important to note that the diaphragm has a recess 200 formed facing the openings 22A and 22B. For reasons of symmetry, two further recesses are provided in the region of the lugs 23. The recess 200 is defined by shortening the appropriate fingers 8 of the diaphragm at their inner periphery, so that they thus have an increased diameter. This makes it possible to fit the coupling member 20 with ease, in spite of the presence of the curved portion 132 which serves for prepositioning the arm portion 125. The inner diameter of the portion 125 may in practice be equal to the outer diameter of the cylindrical portion 130 that is of larger diameter, the dimensions being chosen having regard to the size of the curved portion 132.

The above arrangement ensures that, during fitting of the clutch release bearing 10, with the coupling piece 20 then coming into engagement against the axial base 50 of the openings 22A and 22B (see FIGS. 2 and 4), this engagement on the base 50 will take place outside the radius of curvature of the coupling piece 20 connecting the portion 125 to the main part of the latter. The recess 200 then allows the portion 125 to move, with the expansion of the coupling piece 20, due to the loops formed in its arms, then taking place satisfactorily by engagement on the base 50. The curved portion 132 allows the coupling piece to be prepositioned. It will be recalled that the free configuration of the coupling piece 20 is such that the arms 121A and 121B are spaced away from each other, so that the diameter of the coupling piece is increased.

After the clutch release bearing 10 has been fitted by a snap fit on to the coupling piece 20, and after the arms 121A and 121B have been resiliently hooked together, the arms are able to bear circumferentially and laterally on the bridge portion 32.

For dismantling, the arms 121A and 121B of the coupling piece 20 are merely unhooked, so that the coupling piece then changes from its compressed or closed position to its free or open position. For greater detail, reference is invited to the above mentioned specification No. FR 2 630 174A.

As will be evident from the foregoing description and from the drawings, the presence of the loops 122A and 122B produces an increase in the length of the arms 121A and 121B without leading to any increase in the overall radial length of the arms. In addition, the loops facilitate the gripping effect of the coupling piece 20, and facilitate its removal. It will also be noted that the axial orientation portion 125 facilitates prepositioning of the coupling piece 20.

Although the flange 18 is made by pressing, the internal bore of this flange 18 may be formed with high geometrical precision, with the frusto conical internal median surface of the section 124 of the flange being able to be readily formed by turning with very high precision and very good quality, besides being extremely accurately located. The same geometrical precision can be obtained in the same way in regard to the inner surfaces of the cylindrical portions 130 and 131 joined to the frusto conical section 124 on either side of the latter.

It will be noted that in operation, the coupling piece 20 bears partly on the frusto conical section 124 and partly against the shoulder 14.

The present invention is of course not limited to the embodiments described: for example attachment of the clutch release bearing to the diaphragm may be carried out using a Belleville ring 26 as shown in FIG. 1.

The coupling piece 20 may be provided with only one lug 23 extending partly axially in the manner described in specification No. FR 2 624 935A. In a modification, several loops 122A and 122B may be provided on each arm 121A, 121B, so that the loops increase even more the elasticity of the coupling piece 20, and together constitute a helical spring of the clothes-peg type.

The supplementary elasticity of the piece 20 may be increased by making its supplementary lugs 23 thinner. Finally, instead of loops, the arms may be formed with local elongations in zigzag shape, this arrangement also forming a deformation which lengthens the arms resiliently.

What is claimed is:

1. An actuating assembly for acting in traction between a clutch release bearing and a diaphragm of a clutch, the diaphragm having a central opening, the actuating assembly comprising: an actuating member including a collar portion for engagement on said diaphragm and further including a flange integral with said collar portion, for extending through said central opening of the diaphragm; and a coupling piece comprising a ring portion arranged inside said flange and resiliently deformable in the radial direction, two arms extending outwardly from the ring portion and projecting outwardly with respect to said flange, the arms having means for hooking one over the other, the flange having two distinct openings formed through it with each said arm extending through a respective said opening, and a bridge portion separating said openings from each other, the coupling piece being attachable to said clutch release bearing by simple snap-fitting of the latter, at least in the axial direction going from said collar portion towards said coupling piece, wherein each said arm includes a local deformation comprising loop means for extending its length in a resilient manner, each local deformation being arranged radially inward of said means for hooking an arm over the other arm.

2. An actuating assembly according to claim 1, wherein said local deformation comprises at least one loop.

3. An actuating assembly according to claim 2, wherein said means for hooking on one of said arms comprises a hook for hooking over the other arm, said loop being arranged radially inward of said hook.

4. An actuating assembly according to claim 3, wherein each said arm comprises an axial portion, a first radial portion leading radially outwardly from the axial portion, and a second, inclined, radial portion extending radially outwardly from the first radial portion, said loop of the arm being part of said second radial portion.

5. An actuating assembly according to claim 4, wherein said first portion of the arms are parallel to each other and their said second portions are also parallel to each other, with said first portions being closer to each other than the second portions, each arm further comprising a bent portion joining the first and second portions together.

6. An actuating assembly according to claim 4, wherein said bridge portion is locally deformed at least partly in the radially outward direction, and has an incurved shape, the local deformation of the bridge portion constituting a means whereby said axial portion can be prepositioned.

* * * * *